United States Patent [19]
Fletcher et al.

[11] 3,856,042
[45] Dec. 24, 1974

[54] COMBINED PRESSURE REGULATOR AND SHUTOFF VALVE

[76] Inventors: James C. Fletcher, Administrator of the National Aeronautics and Space Administration with respect to an invention by; Edgar F. Koch, Tujunga, Calif.

[22] Filed: June 21, 1973

[21] Appl. No.: 372,149

[52] U.S. Cl.............. 137/505.42, 74/424.8 VA, 137/505.38
[51] Int. Cl............................................ F16k 17/04
[58] Field of Search..... 137/505.38, 505.39, 505.41, 137/505.42; 74/424.8 VA

[56] References Cited
UNITED STATES PATENTS

| | | | |
|---|---|---|---|
| 1,410,089 | 3/1922 | Wilkins | 137/505.42 |
| 2,764,996 | 10/1956 | Brown | 137/505.42 X |
| 2,881,792 | 4/1959 | Spence | 137/505.14 X |
| 2,984,252 | 5/1961 | Bryant | 137/505.42 X |
| 3,327,826 | 6/1967 | Henschke | 74/424.8 VA X |
| 3,466,945 | 9/1969 | McNeal | 74/424.8 VA X |
| 3,699,998 | 10/1972 | Baranowski | 137/505.42 X |

*Primary Examiner*—Harold W. Weakley
*Attorney, Agent, or Firm*—Wilfred Grifka; Monte F. Mott; John R. Manning

[57] ABSTRACT

A remotely operable pressure regulator and shutoff valve particularly suited for achieving high resolution and flow control, and positive shutoff. The valve is characterized by a spring-loaded ball coaxially aligned with a fluid port to be sealed, a spring-loaded pintle extended through the port into engagement with the ball, for controlling the position thereof, a spring-loaded diaphragm for controlling the position of the pintle, and an axially displaceable spring supported by a movable stop which, in turn, is repositioned by a selectively operable stepper motor. Thus, the pressure-response characteristics for the valve readily can be varied through a selective repositioning of the stop.

1 Claim, 4 Drawing Figures

3,856,042

COMBINED PRESSURE REGULATOR AND SHUTOFF VALVE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention:

The invention relates generally to flow control valves, and more particularly to a flow control valve in which compressive forces of a reference spring are varied by repositioning a reactive stop to provide a range of variations in flow regulation, as well as to impart to the valve a cutoff capability.

2. Description of the Prior Art:

The prior art, of course, includes various types of flow control mechanisms which employ biasing forces in achieving flow control. Normally, pressure regulators include springloaded diaphragms which are employed in achieving flow control with cutoff capabilities being imparted thereto through a use of additional valving structure which acts independently of the structure employed in achieving flow control. In instances where attempts have been made to achieve both flow control and valve shutoff capabilities, the resulting structure is complex and generally impractical. As is readily appreciated by those familiar with the valve art, in order to increase the efficiency and reliability of flow control systems, simplification of valve structure is important, particularly to those engaged in the design of spacecraft and the like.

It is therefore the purpose of the instant invention to provide a simplified valve having a capability for functioning as a high-resolution, variable-pressure gas regulator, as well as for functioning as a shutoff valve, while simplifying valve configuration and increasing reliability.

OBJECTS AND SUMMARY OF THE INVENTION

It is therefore an object of the instant invention to provide an improved, simplified valve for achieving flow control over a stream of pressurized fluid.

Another object is to provide in a pressure regulator and shutoff valve means responsive to selected changes in the fluid pressures for achieving flow control and flow termination.

Another object is to provide a valve for achieving flow control over a stream of pressurized fluid, including both a pressure-responsive pintle and a spring-loaded ball for achieving pressure-control and flow-termination.

These and other objects and advantages are achieved through a use of a valve having a valve housing with a passage for pressurized fluid defined therewithin, a sealable port provided within the passage, a spring-loaded ball supported for incremental movement between a first position wherein the ball is seated in the port end, in sealing relation therewith, and a second position wherein the ball is disposed in spaced, juxtaposition with the port for facilitating a flow of pressurized fluid therethrough, and an axially movable pintle extended through the port into engagement with the spring-loaded ball connected with a pressure-responsive diaphragm supported by a reference spring, the compressive forces of which are varied by selectively repositioning a reactive stop provided therefor, as will hereinafter become more readily apparent by reference to the following description and claims in light of the accompanying drawings.

DESCRIPTION OF THE PREFERRED EMBODIMENT

Figure 1:
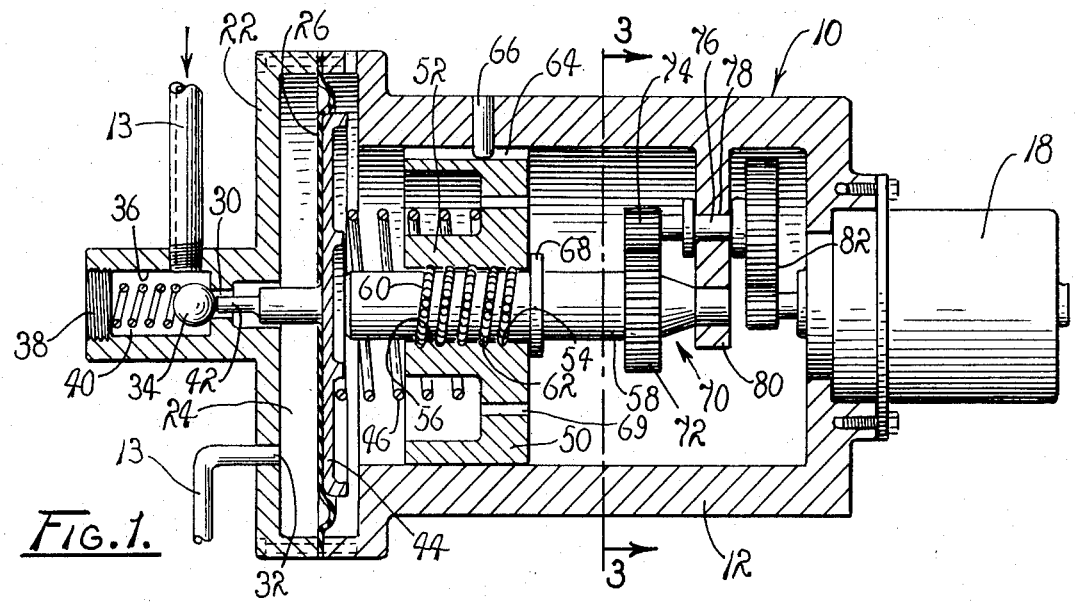
FIG. 1 is a cross-sectional view of a valve which embodies the principles of the instant invention, illustrating the valve operating in its shutoff mode.
Figure 3:
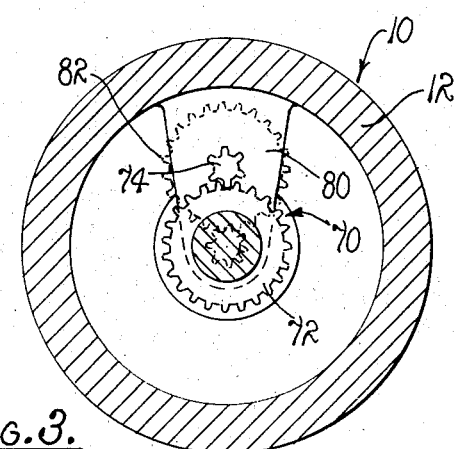
FIG. 3 is a cross-sectional view taken generally along line 3—3 of FIG. 1.
Figure 2:
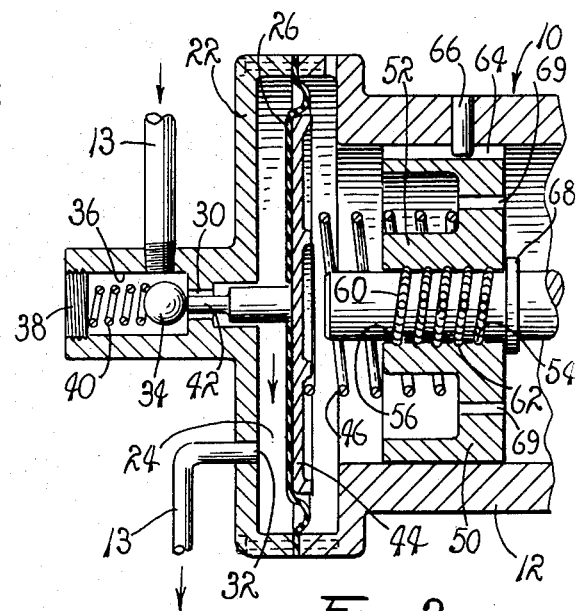
FIG. 2 is a fragmented sectional view, similar to the view shown in FIG. 1, illustrating the valve operating in its pressure regulating mode.

Turning now to the drawings, wherein like reference characters designate like or corresponding parts throughout the several views, there is shown in FIG. 1 a valve 10 which embodies the principles of the instant invention.

Figure 4:
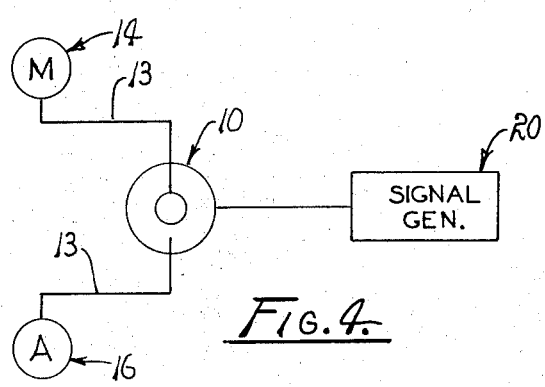
FIG. 4 is a diagrammatic view depicting an operative environment for the valve.

The valve 10 is provided with a suitable housing 12 fabricated in a suitable manner employing suitable materials. Since the particular material from which the valve is fabricated, and the techniques employed in fabricating the valve form no specific part of the instant invention a detailed description thereof is omitted in the interest of brevity. However, it is to be understood that the valve 10, through suitable pressure lines 13, is coupled between a source of gas under pressure, designated 14, FIG. 4, and an actuator, designated 16. Moreover, the valve 10, in operation, is controlled through a stepper motor 18 mounted on the housing 12 and controlled by a suitable signal generator, generally designated 20, through electrical leads, not designated. It is important to note that the source of pressurized gas 14, the actuator 16, the stepper motor 18, and the signal generator 20 are commercially available and are well within the skill of the art. Therefore, since these components form no specific part of the instant invention, a detailed description thereof is omitted in the interest of brevity.

Referring again to FIG. 1, the housing 12 is of a bell-shaped configuration and includes, at one end thereof, a cover plate 22 of a dish-shaped configuration adapted to mate with the housing 12 for defining within the housing a plenum chamber 24. The plenum chamber 24 is hermetically sealed by a diaphragm 26 having its peripheral portions interposed in an hermetically sealed relationship between the cover plate 22 and the adjacent surface of the housing 12 in a manner well understood by those familiar with the valve art.

Gas under pressure is admitted to the plenum chamber 24 through a pressure port, generally designated 30, and permitted to exit the plenum chamber through an exhaust port 32. Thus, it can be appreciated that as gas is delivered, under pressure, to the valve 10, it is conducted along a tortuous path extending from one of the lines 13 to the plenum chamber 24, via the pressure port 30, and thence to the actuator 16 via the exhaust port 32.

Control over the flow of gas through the plenum chamber 24 is achieved through the use of a spring-loaded ball 34 supported for rectilinear movement along a path coaxially aligned with the port 30. The cover plate 22 is configured to include an internal bore 36 coaxially aligned with the pressure port 30 and hermetically sealed by a suitable closure plug 38 screwthreaded into the distal end of the bore. Spring-loading of the ball 34 is achieved through the use of a helical spring 40 disposed within the bore 36 and seated against the plug 38, which functions as a reactive stop for the spring. Thus the spring 40 is interposed between the plug 38 and the ball 34 so that the ball is continuously biased or urged in displacement toward the port 30.

It is important here to note that the line 13, extending from the source of gas under pressure 14, communicates with the bore 36. Thus the source 14 communicates with the plenum chamber 24 through the pressure port 30. This communication is interrupted as the ball 34 is caused to seat in an hermetic sealing relation with the port 30. The spring-loaded ball 34, therefore, performs a shutoff function for the valve 10 as it seats and hermetically seals the port 30.

While not shown, it is to be understood that where desired, a ball seat can be provided within the port in a manner well understood by those familiar with the valve art.

Unseating of the spring-loaded ball 34 is accomplished through the use of an axially reciprocable pintle 42. This pintle extends through the port, in concentric relationship therewith, into contiguous engagement with the spring-loaded ball 34. Thus through the spring 40 and the pintle 42 opposed forces are applied to the ball 34. Obviously, the differential in total forces applied to the ball necessarily determine the direction and extent of its rectilinear motion. Of course, a static condition is imposed on the ball 34 once the opposed forces applied by the spring 40 and pintle 42 are balanced.

The pintle 42 is mounted on an axially movable plate 44, coaxially aligned with the port 30, and extended toward the port in coaxial alignment therewith. Thus, the plate 44 and the pintle 42 are integrated into a single unit so that axial motion is imparted to the pintle 42 as rectilinear motion, in axial directions, is imparted to the plate. As a practical matter, the plate 44 is securely affixed to the flexible diaphragm 26, in any suitable manner, so that the diaphragm serves to support the plate 44 and the pintle 42. Therefore, it should be apparent that as pressure is increased within the plenum chamber 24, the flexible diaphragm 26 is caused to move away from the pressure port 30, for thereby withdrawing the pintle 42 from the port.

In order for the pintle 42 to move toward the pressure port 30, there is provided a reference spring 46 interposed between the plate 44 and a block 50, having a center post 52, which functions as a reactive stop for the spring 46. The spring 46 is of a helical configuration seated on the post 52 between the block 50 and the plate 44, for urging the plate in displacement toward the pressure port 30. In the event the pressure of the fluid introduced into the plenum chamber 24 overcomes the pressure developed by the spring 46, the plate 44 is moved away from the pressure port 30, against the applied forces of the spring. Conversely, in the event the pressure applied to the plate 44, by the spring 46, overcomes the pressure of the fluid within the plenum chamber 24, the plate 44 is moved toward the pressure port 30. Therefore, the differential between the total forces oppositely applied to the diaphragm 26 dictate the position which will be assumed by the plate 44, and, consequently, the position which will be assumed by the pintle 42, relative to the port 30.

In order to impart to the valve 10 the characteristics of a variable pressure regulator, the block 50 is supported by the internal surface of the housing 12 for rectilinear reciprocation along a path paralleling the longitudinal axis of the pintle 42. Thus, the force applied by the reference spring 46 to the plate 44, for any preselected position for the plate, can be varied by simply changing the spatial relationship of the block 50 relative to the pressure port 30.

In order to achieve a changing of the spatial relationship between the pressure port 30 and the block 50, the peripheral surface of the block and the internal surfaces of the housing 12 are machined so that these surfaces function as plane bearing surfaces whereby the block 50 can readily be reciprocated within the housing. The center post 52 is provided with an internal helical ball groove 54 extended along the cylindrical surface of a bore, designated 56, provided concentrically within the center post. Within the bore 56 there is seated a drive shaft 58, also having a ball groove 60. This groove is configured to mate with the ball groove 54.

Between the mated ball grooves, there is provided a series of balls 62 which are commonly received by the grooves in a well understood manner. Thus, the block 50 is, in operation, advanced relative to the housing 12 simply by imparting rotation to the shaft 58 so that the shaft, in effect, serves as a jackscrew for varying the position of block 50, relative to the port 30. As a practical matter, the surface of the block 50 is provided with an elongated groove 64 within which is seated a key 66, affixed to the housing, for restraining the block against rotation as rotation is imparted to the drive shaft 58. Moreover, a limit stop collar 68 is, where desired, seated on the shaft 58 in order to limit the travel of the block along the shaft. In practice, a series of vent holes 69 is provided for venting a resulting chamber defined between the block 50 and the plate 44 in order to avoid an establishment of a differential pressure across the opposite faces of the block.

As illustrated, the valve 10 preferably is remotely actuated in response to electrical signals supplied to the stepper motor 18 and derived from the signal generator 20. Therefore, a gear train, generally designated 70, is interposed between a rotary output shaft, not designated, of the stepper motor 18 and the shaft 58. The gear train 70 includes a bull gear 72 meshed with a driven pinion gear 74. The pinion gear 74 is supported at the distal end of a drive shaft 76 which, in turn, is supported for rotation by a suitable bearing sleeve 78 received in a bearing mount 80. This mount is provided internally of the housing 12. The pinion gear 74, in turn, is driven by a coupling including a spur gear 82 mounted on the opposite end of the shaft 76 and driven by the stepper motor.

Thus, rotary motion is imparted to the drive shaft 76 in response to a driving output derived from the stepper motor 18 and applied to the bull gear 72, via the pinion gears 74 and 82. Therefore, it should be apparent that the instantaneous position of the block 50, relative to the pressure port 30, readily is varied simply by driving the stepper motor 18 in a selected direction, for a predetermined interval of time, as dictated by electrical signals provided by the signal generator 20.

OPERATION

It is believed that in view of the foregoing description, the operation of the device will readily be understood and it will be briefly reviewed at this point.

With the valve 10 assembled in the manner hereinbefore described, the valve is readily employable as a variable pressure regulator possessing valve cutoff capabilities. Hence, in effect, the valve 10 performs multiple functions heretofore requiring a use of multiple special purpose valves. In performing these functions, the stepper motor 18 is driven in directions and for durations dictated by signals derived from the signal generator 20. This driving of the motor imparts selected rotation to the drive shaft 58, whereupon responsive translation of the block 50 is achieved. The precise position to which the block 50 is advanced can be detected, calculated, or, if desired, empirically established. Upon the block coming to rest, the reference spring 46 serves to apply a determinable force to the plate 44 for displacing the plate toward the pressure port 30, through a distance determined by the resistance offered by the pressure of the fluid confined within the plenum chamber 24.

Once a balance of applied forces is achieved, the plate 44 comes to rest. The position of the plate 44, at rest, determines the axial position of the pintle 42 relative to the port 30. The position of the pintle 42 relative to the port 30 determines the position assumed by the spring-loaded ball 34, relative thereto.

Hence, it can be appreciated with the ball 34 lifted from its sealing relationship with the pressure port 30, gas under pressure is delivered to the plenum chamber 24 via the pressure port. In the event the pressure within the plenum chamber increases above a preselected value, the resultant forces cause the spring 46 to collapse for thus withdrawing the pintle from the pressure port 30. As the pintle is withdrawn, the ball 34 advances toward the pressure port 30. Since the plenum chamber 24 continuously is vented, via one of the lines 13, the pressure within the plenum chamber 24 normally drops quite rapidly so that the applied force of the spring 46 again moves the plate 44 towards the pressure port 30 for again lifting the ball 34. However, in the event the pressure within the plenum chamber 24 becomes sufficiently great, the ball 34 comes to rest within the port 30 for hermetically sealing the port and thus functioning as a cutoff. As should be apparent, cutoff also can be selectively achieved simply by advancing the block 50 away from the port 30 through a selective energization of the stepper motor 18.

In view of the foregoing, it should readily be apparent that through the use of a repositionable block serving as a reactive stop for a reference spring, a wide range of variations in fluid flow can readily be achieved, with high resolution, equally as well as a selected termination of fluid flow. These capabilities impart to the valve characteristics of both a variable pressure gas regulator and shutoff valve.

Although the invention has been herein shown and described in what is conceived to be the most practical and preferred embodiment, it is recognized that departures may be made therefrom within the scope of the invention, which is not to be limited to the illustrative details disclosed.

What is claimed is:
1. A valve for achieving flow control over a stream of pressurized fluid comprising:
    A. a valve housing having means defining therein a fluid inlet orifice, a fluid discharge orifice and a passage for pressurized fluids extended therebetween;
    B. means defining within said passage a sealable port of cylindrical configuration;
    C. a ball supported within said passage for incremental movement between a first position, wherein said ball is seated in said port in a sealing relationship therewith for interrupting a flow of pressurized fluid therethrough, and a second position, wherein said ball is disposed in spaced relation with the port for accommodating a flow of pressurized fluid therethrough;
    D. means for continuously urging said ball in displacement toward said first position including a first helical spring seated within said passage in contiguous relation with said ball;
    E. means for displacing said ball toward said second position including,
        1. an axially movable pintle having one end extended axially through said port into abutting engagement with the ball, and
        2. means supporting said pintle for axial motion relative to said port including an axially displaceable disk disposed in coaxial alignment with the opposite end of said pintle and rigidly affixed thereto; and
    F. means for imparting axial motion to said pintle including,
        1. a flexible diaphragm secured to said disk and extended radially from the periphery thereof into sealed relation with said housing for defining within the housing an hermetically sealed, expansible plenum chamber communicating with said port and said fluid discharge orifice for moving said pintle in a first direction relative to said port in response to increased pressures within said plenum chamber, and
        2. means for continously urging said pintle in displacement in a second direction opposite said first direction including a second helical spring, having one end portion engaging said disk, extended away from said plenum chamber, reactive stop means for supporting said second helical spring including an axially movable block having a tubular bore extended axially therethrough in coaxial alignment with said port, means including a mounting post concentrically related to said bore for receiving the opposite end portion of said second helical spring in a concentric relationship, means for imparting axial motion to said movable block including means for supporting said block against rotary motion, a drive shaft supported for rotary motion and extended concentrically through said bore, a ball-and-groove coupling interconnecting said drive shaft and said block, including means defining opposed helical grooves extended along the adjacent surfaces of said drive shaft and said bore, a plurality of balls seated in said opposed grooves, drive means including a reversible stepper motor, and a gear train connecting said stepper motor with said drive shaft for imparting rotary motion to the drive shaft, whereby axial motion is imparted to said block for axially displacing said second helical spring relative to said plenum chamber.

* * * * *